United States Patent
Bykovnikov

(10) Patent No.: US 7,756,208 B2
(45) Date of Patent: Jul. 13, 2010

(54) MULTICARRIER COMMUNICATION SYSTEM AND METHODS FOR COMMUNICATING WITH SUBSCRIBER STATIONS OF DIFFERENT BANDWIDTH PROFILES

(75) Inventor: Vladimir Bykovnikov, Nyzhny Novgorod region (RU)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 11/339,945

(22) Filed: Jan. 26, 2006

(65) Prior Publication Data

US 2006/0146949 A1 Jul. 6, 2006

Related U.S. Application Data

(63) Continuation of application No. PCT/RU2004/000481, filed on Nov. 29, 2004.

(51) Int. Cl.
*H04L 27/28* (2006.01)

(52) U.S. Cl. .................. 375/260; 375/259; 375/264; 375/299

(58) Field of Classification Search .................. 375/260, 375/259, 264, 299
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 2003/0123383 | A1* | 7/2003 | Korobkov et al. | 370/208 |
| 2005/0018784 | A1* | 1/2005 | Kurobe et al. | 375/260 |
| 2006/0067416 | A1* | 3/2006 | Tirkkonen et al. | 375/260 |
| 2007/0211810 | A1* | 9/2007 | Bohnke et al. | 375/260 |
| 2008/0039107 | A1* | 2/2008 | Ma et al. | 455/450 |

FOREIGN PATENT DOCUMENTS

| EP | 0753948 A1 | 1/1997 |
|---|---|---|
| EP | 1267540 A1 | 12/2002 |

* cited by examiner

*Primary Examiner*—Shuwang Liu
*Assistant Examiner*—Kenneth Lam
(74) *Attorney, Agent, or Firm*—Schwegman, Lundberg & Woessner, P.A.; Gregory J. Gorrie

(57) ABSTRACT

A multicarrier base station communicates with subscriber stations of different bandwidth profiles by allocating time slots in downlink and uplink frames and subcarriers of a single multicarrier communication channel to various bandwidth subchannels.

12 Claims, 4 Drawing Sheets

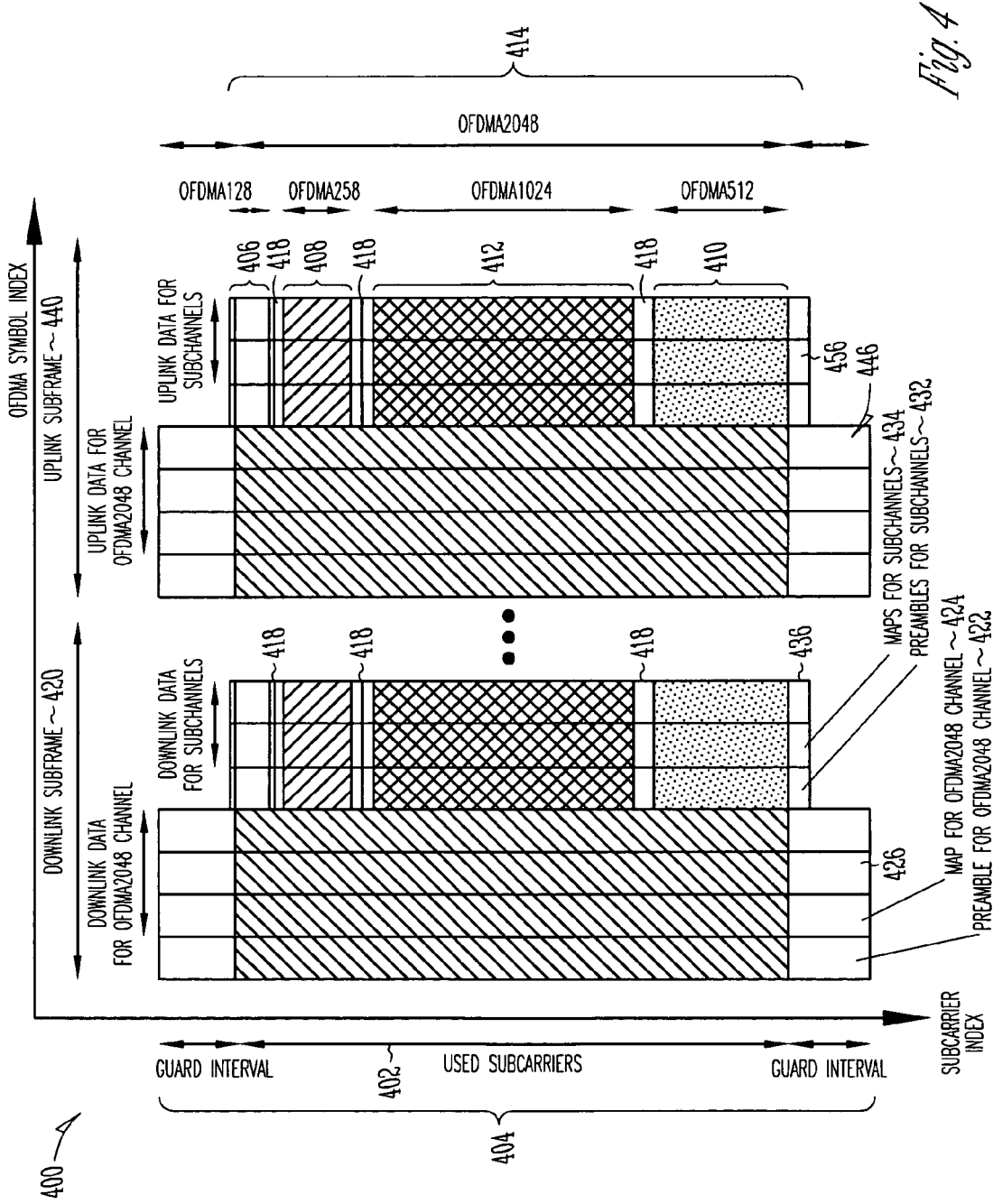

MULTICARRIER COMMUNICATION SYSTEM AND METHODS FOR COMMUNICATING WITH SUBSCRIBER STATIONS OF DIFFERENT BANDWIDTH PROFILES

This application is a continuation under 35 U.S.C. 111(a) of International Application No. PCT/RU2004/000481, filed on 29 Nov. 2004, which is incorporated herein by reference.

TECHNICAL FIELD

Embodiments of the present invention pertain to multicarrier communications. Some embodiments of the present invention pertain to orthogonal frequency division multiple access (OFDMA) communications.

BACKGROUND

Multicarrier communication systems, such as orthogonal frequency division multiple access (OFDMA) systems, use a set of symbol-modulated subcarriers to communicate information within an available spectrum. Many modern digital communication systems, including wireless metropolitan area networks (WMANs) and wireless local-area networks (WLANs), are using multicarrier signals to help signals survive in environments having multipath reflections. One problem with some of these conventional multicarrier communication systems is that some base stations operate using a fixed channel bandwidth, such as 20 MHz. This limits a base station's use to communications with subscriber stations that use the same number of subcarriers across the same bandwidth and does not permit communications with subscriber stations of different bandwidth profiles.

BRIEF DESCRIPTION OF THE DRAWINGS

FIG. 4 illustrates a frame structure for communicating with various bandwidth profile subscriber stations in accordance with some embodiments of the present invention.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
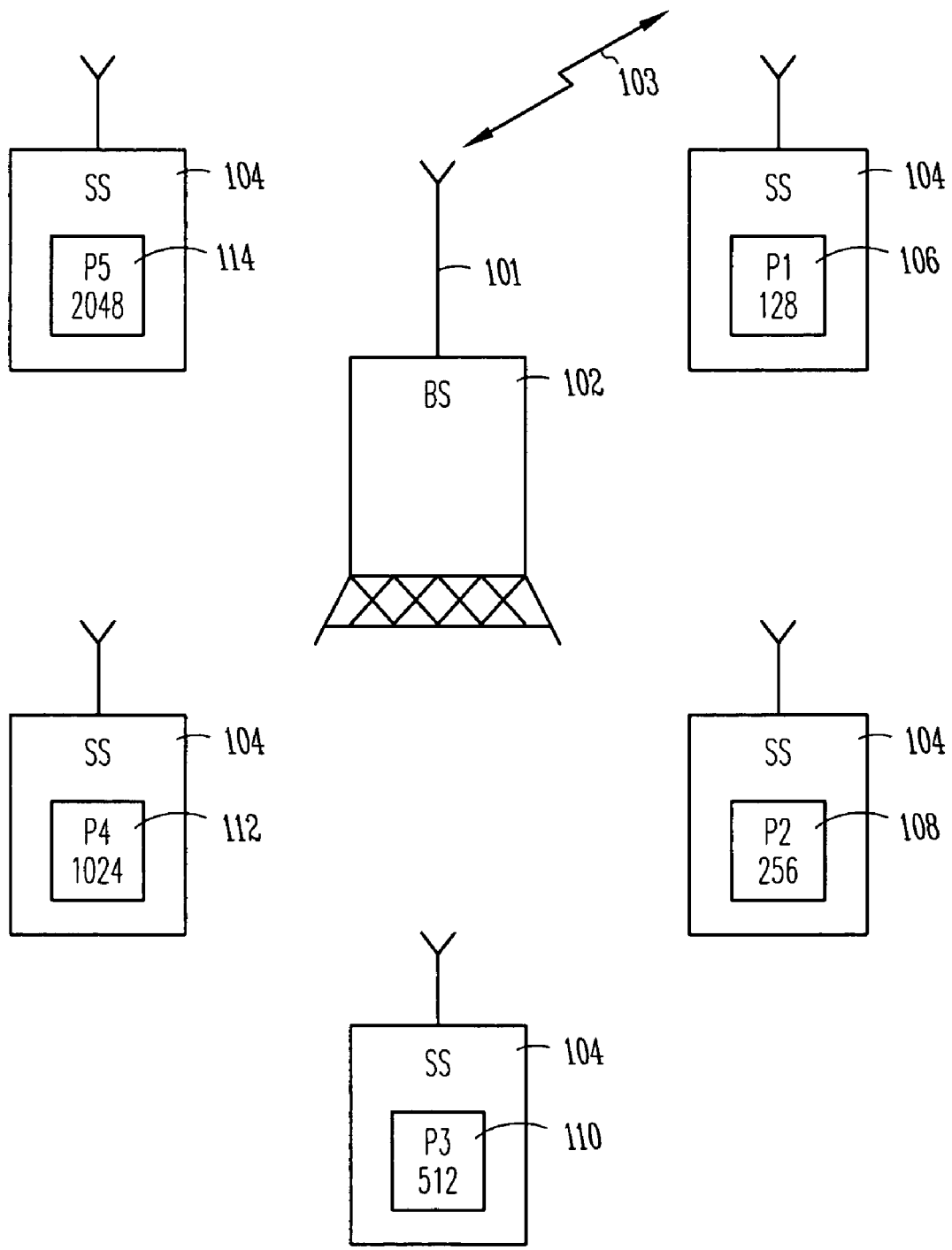
FIG. 1 illustrates a communication environment in accordance with some embodiments of the present invention.

FIG. 1 illustrates a communication environment in accordance with some embodiments of the present invention. Multicarrier base station 102 communicates multicarrier communication signals 103 with one or more subscriber stations 104 over a multicarrier communication channel. Subscriber stations 104 may have different bandwidth profiles and may be allocated varying amounts of subcarriers of a standard multicarrier communication channel based on their bandwidth profile. In some embodiments, multicarrier base station 102 may be a broadband wireless base station that communications using orthogonal frequency division multiple access (OFDMA) communications, which may be in accordance with the IEEE 802.16 (published 2004) and/or IEEE 802.16 (e) standards, although the scope of the invention is not limited in these respects. In some of these embodiments, the single multicarrier communication channel may have a 20 MHz bandwidth and the communications between subscriber stations 104 and base station 102 may be time synchronized. These embodiments are described in more detail below.

In some embodiments, base station 102 may allocate subcarriers of a single multicarrier communication channel to subscriber stations 104 based on a bandwidth profile associated with the individual subscriber station. In these embodiments, base station 102 may communicate with a full bandwidth subscriber station (i.e., subscriber station 114) using either substantially all the subcarriers or subsets of the subcarriers of the multicarrier communication channel within a frame. In these embodiments, base station 102 may also communicate over subchannels with narrower-bandwidth subscriber stations (i.e., subscriber stations 106-112) using the allocated time-slots and subcarriers within the frame.

Subscriber stations 104 may be wireless communication devices that may include personal digital assistants (PDAs), laptop or portable computers with wireless communication capability, web tablets, wireless telephones, wireless headsets, pagers, instant messaging devices, access points or other devices that may receive and/or transmit information wirelessly. In some embodiments, subscriber stations 104 and base station 102 may transmit and/or receive radio-frequency (RF) communications in accordance with specific communication standards, such as the Institute of Electrical and Electronics Engineers (IEEE) standards including the IEEE 802.16-2004 and/or IEEE 802.16(e) standards for wireless metropolitan area networks (WMANs), although subscriber stations 104 and base station 102 may also be suitable to transmit and/or receive communications in accordance with other techniques.

Base station antenna 101 may include one or more of a directional or omnidirectional antenna, including, for example, a dipole antenna, a monopole antenna, a patch antenna, a loop antenna, a microstrip antenna, a sector antenna, an advanced antenna system (AAS) or other type of antenna or antenna system suitable for reception and/or transmission of RF signals which may be processed by base station 102.

Figure 2:
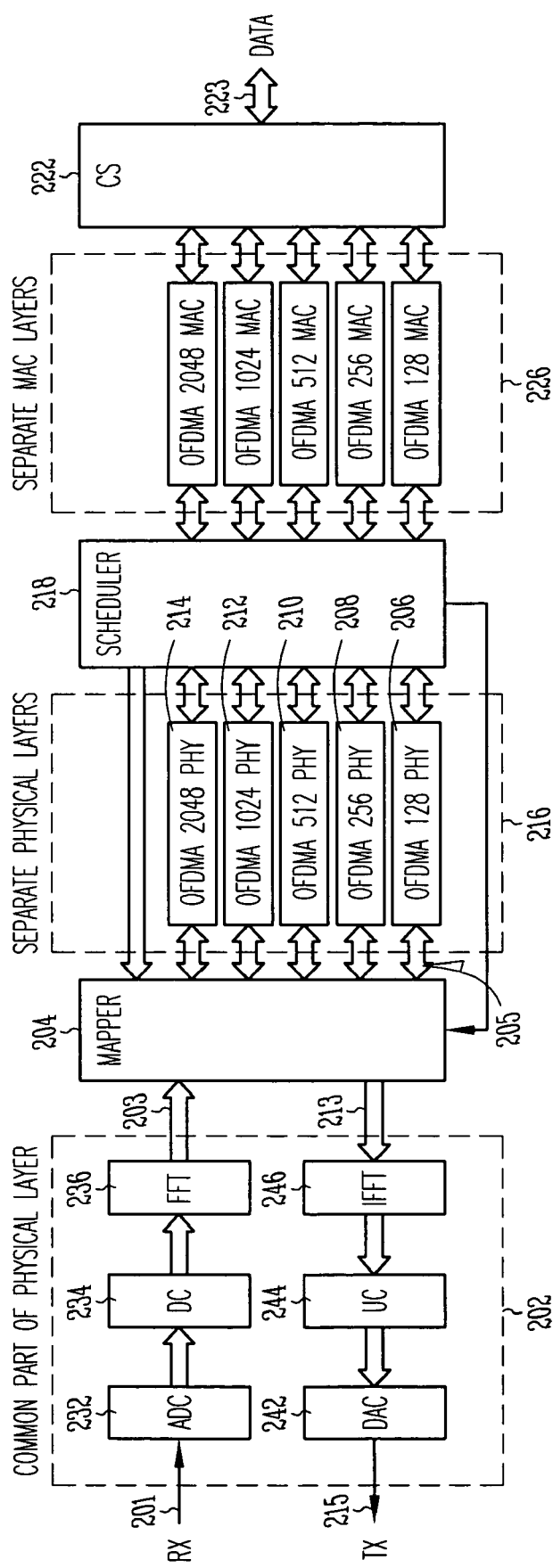
FIG. 2 is a functional block diagram of a multicarrier base station in accordance with some embodiments of the present invention.

FIG. 2 is a functional block diagram of a multicarrier base station in accordance with some embodiments of the present invention. Multicarrier base station 200 may be suitable for use as multicarrier base station 102 (FIG. 1) and may communicate multicarrier signals with subscriber stations of various bandwidth profiles as described in more detail below.

The receiver side of multicarrier base station 200 comprises front-end physical-layer circuitry 202 to receive multicarrier communication signals 201 within a single channel bandwidth and to generate frequency-domain samples 203 associated with each of the subcarriers of the multicarrier communication channel. Multicarrier base station 200 may also include mapper 204 to map frequency-domain samples 203 from groups of subcarriers to physical-layer circuitry 216. In some embodiments, physical-layer circuitry 216 may include separate functional elements associated with the various bandwidth profiles of the subscriber units.

Physical-layer circuitry 216 may generate a decoded bit stream from frequency-domain samples 205 provided by mapper 204 for each bandwidth profile. Multicarrier base station 200 may also include scheduler 218 to generate frames for each bandwidth profile and media-access-control (MAC) layers 226 to process the frames for each bandwidth profile. In some embodiments, MAC layers 226 may include separate functional elements to process bits from each bandwidth profile and to apply one of a plurality of protocols to the separated data based on the associated bandwidth profile.

Multicarrier base station 200 may also comprise convergence sublayer (CS) 222 to provide an interface with a network, such as the Internet, an Ethernet, an asynchronous transfer mode (ATM) network or other network. In some embodiments, convergence sublayer 222 may be capable of generating separate data packets of data streams for each bandwidth profile received from MAC layer 226.

In some embodiments, front-end physical-layer circuitry 202 may comprise analog-to-digital conversion (ADC) circuitry 232 and down-converter circuitry 234 to generate time-domain digital samples from the multicarrier communication signals received within the channel bandwidth. Front-end physical-layer circuitry 202 may also include Fourier transform circuitry 236 to perform a Fourier transformation on the time-domain digital samples to generate frequency-domain samples 203 associated with each of the subcarriers. In these embodiments, mapper 204 may map frequency-domain samples 203 to physical-layer circuitry 216 for separate processing subcarriers associated with the each bandwidth profile based on information provided by scheduler 218.

The transmit side of multicarrier base station 200 may include digital-to-analog conversion (DAC) circuitry 242 and upconverter 244 to generate multicarrier RF signals 215 for transmission to subscriber stations of the various bandwidth profiles. The transmit side of multicarrier base station 200 may also include inverse Fourier transform circuitry 246 to generate time-domain samples from frequency-domain samples 213 associated with each subcarrier. Mapper 204 may combine frequency-domain samples 205 associated with subcarriers for each of the bandwidth profiles provided by physical-layer circuitry 216 associated with the different bandwidth profiles. Inverse Fourier transform circuitry 246 may perform an inverse Fourier transformation on combined frequency-domain samples 213 to generate the single multicarrier communication signal for transmission to the various bandwidth profile subscriber stations. To achieve orthogonality between closely spaced subcarriers, in some embodiments, each subcarrier of the multicarrier signal may have a null at substantially a center frequency of the other subcarriers of the multicarrier signal.

Although base station 200 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein. In some embodiments, the functional elements of base station 200 may refer to one or more processes operating on one or more processing elements.

Figure 3:
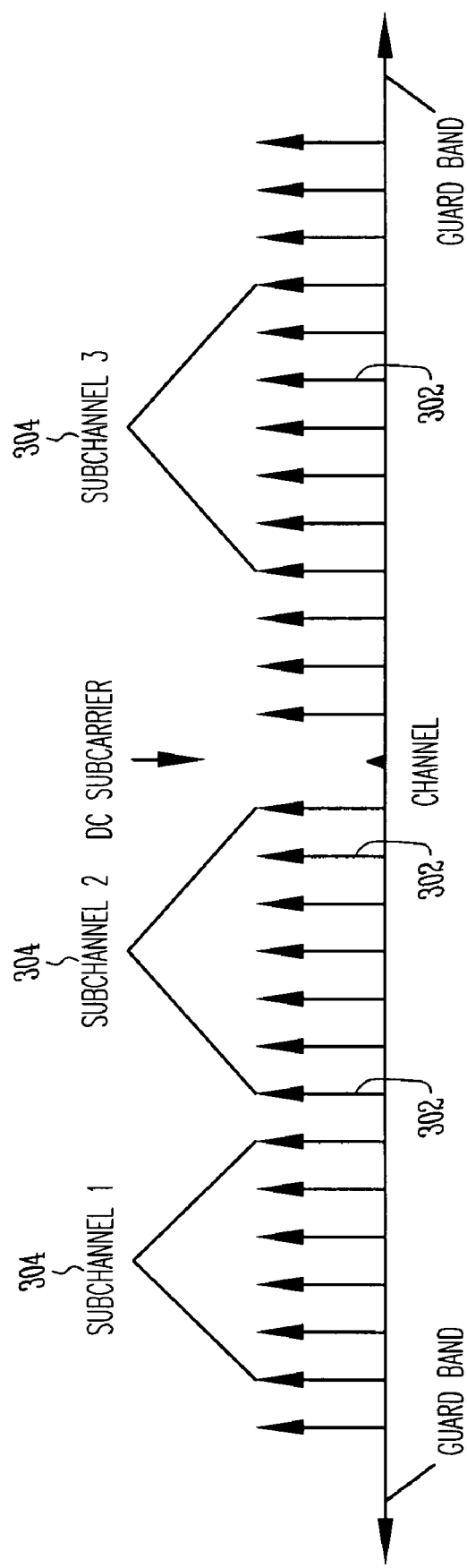
FIG. 3 illustrates an example of subcarrier allocation of a multicarrier communication channel in accordance with some embodiments of the present invention.

FIG. 3 illustrates an example of subcarrier allocation of a multicarrier communication channel in accordance with some embodiments of the present invention. Multicarrier communication channel 300 comprises a plurality of closely-spaced subcarriers 302. Each subcarrier 302 may be associated with a different frequency (e.g., tone) within the bandwidth of communication channel 300. Some subscriber stations (e.g., a full-bandwidth subscriber station) may communicate using subcarriers of substantially the entire bandwidth, while other subscriber stations (e.g., narrower-bandwidth subscriber stations) may communicate using less than the total number of subcarriers of the entire bandwidth. In these embodiments, narrower-bandwidth subscriber stations may communicate over subchannels 304 comprising less than the total number of subcarriers of communication channel 300.

FIG. 4 illustrates a frame structure for communicating with various bandwidth profile subscriber stations in accordance with some embodiments of the present invention. Frame structure 400 includes downlink subframe 420 and uplink subframe 440 which may be transmitted on subcarriers 402 of channel bandwidth 404. Channel bandwidth 404 may correspond to channel bandwidth 300 (FIG. 3).

In some embodiments, the subchannels may comprise first subchannel 406 having approximately one-sixteenth the subcarriers of channel bandwidth 404, second subchannel 408 having approximately one-eighth the subcarriers of channel bandwidth 404, third subchannel 410 having approximately one-fourth the subcarriers of channel bandwidth 404, and fourth subchannel 412 having approximately one-half the subcarriers of channel bandwidth 404, although the scope of the invention is not limited in this respect. In some embodiments, the full channel bandwidth and the subchannels in turn may be further divided in smaller subchannels in order to achieve additional sub-channelization gain. Accordingly, some narrower-bandwidth subscriber stations, such as communication station 112 (FIG. 1), may communicate over subchannel 412 that is allocated about approximately half the subcarriers of the multicarrier communication channel. Some narrower-bandwidth subscriber stations, such as subscriber station 110 (FIG. 1), may communicate over subchannel 410 that is allocated about approximately one-fourth the subcarriers of the multicarrier communication channel. Some narrower-bandwidth subscriber stations, such as subscriber station 108 (FIG. 1) may communicate over subchannel 408 that is allocated about approximately one-eighth the subcarriers of the multicarrier communication channel. Some narrower-bandwidth subscriber stations, such as communication station 106 (FIG. 1), may communicate over subchannel 406 that is allocated about approximately one-sixteenth the subcarriers of the multicarrier communication channel. In these embodiments, some of the subcarriers may remain unused during some time slots and may provide guard intervals 418 between the subchannels. In these embodiments, full-bandwidth subscriber stations, such as subscriber station 114 (FIG. 1), may communicate over standard channel 414 that uses either most or substantially all subcarriers of the multicarrier communication channel or a substantial subset of the subcarriers.

In these embodiments, scheduler 218 (FIG. 2) may divide the single multicarrier communication channel into the plurality of subchannels based on the bandwidth profiles of the subscriber stations. Each subchannel may comprise one of a plurality of a predetermined number of orthogonal subcarriers of the multicarrier communication channel. Each of the predetermined number of subcarriers for each subchannel may be based on an associated one of the bandwidth profiles.

In some embodiments, a standard channel may refer to an OFDMA multicarrier communication channel utilizing all or substantially all subcarriers of multicarrier communication channel of a predetermined bandwidth. In some embodiments, the subchannels may comprise portions or groups of subcarriers of the standard-bandwidth channel and may have a predetermined number of subcarriers less than all of the subcarriers. In some embodiments, the predetermined bandwidth of a standard channel may be approximately 20 MHz and may be associated with a fast Fourier transformation (FFT) size of 2048, although the scope of the invention is not limited in this respect. In these embodiments, the subchannels may also comprise OFDMA multicarrier communication channels. In some embodiments, subchannel 412 may be associated with an FFT size of 1024 and may have a 10 MHz bandwidth. In some embodiments, subchannel 410 may be associated with an FFT size of 512 and may have a 5 MHz bandwidth. In some embodiments, subchannel 408 may be associated with an FFT size of 256 and may have a 2.5 MHz bandwidth. In some embodiments, subchannel 406 may be associated with an FFT size of 128 and may have a 1.25 MHz bandwidth, although the scope of the invention is not limited in this respect. Full-bandwidth subscriber stations, such as subscriber station 114 (FIG. 1), may refer to subscriber stations 104 that operate using the subcarriers of a standard channel, and narrower-bandwidth subscriber stations, such as subscriber stations 106-112 (FIG. 1) may refer to subscriber stations that operate using assigned or allocated subcarriers of one of the subchannels. Each subscriber station 104 may be associated with one of these bandwidth profiles and may communicate with different media-access control (MAC) layer protocols, although the scope of the invention is not limited in this respect.

Although FIG. 4 illustrates subchannels 406, 408, 410 and 412 within certain positions and in a particular order within the communication channel, this is not a requirement. Channel bandwidth 404 may be configured in many different ways. For example, in some embodiments, subchannel 406 and/or subchannel 408 may be allocated subcarriers (i.e., positioned) between subchannels 410 and 412.

In some embodiments, the particular subchannels may be dynamically configured depending on the bandwidth profile of the subscriber units that wish to communicate with the base station. In these embodiments, channel bandwidth 404 may be divided into many different combinations of the subchannels, such as two half-bandwidth subchannels (e.g., when there are many half-bandwidth subscriber stations), or four quarter-bandwidth subchannels, one half-bandwidth subchannel and two quarter-bandwidth subchannels, etc.

In some embodiments, timing information for downlink data time slot 426 and uplink data time slot 446 may be transmitted to full-bandwidth subscriber stations in standard channel mapping time slot 424. Timing information for downlink data time slot 436 and uplink data time slots 456 may be transmitted to narrower-bandwidth subscriber stations in subchannel mapping time slot 434. In these embodiments, standard channel mapping time slot 424 may be transmitted in an initial portion of downlink subframe 420, and subchannel mapping time slot 434 may be transmitted in a later portion of downlink subframe 420 as illustrated, although the scope of the invention is not limited in this respect.

In some embodiments, standard channel mapping time slot 424 may be transmitted using subcarriers comprising standard channel 414 (i.e., most or substantially all data subcarriers of the standard channel), and subchannel mapping time slot 434 may be divided into one or more subchannels (406-412) of standard channel 414. In these embodiments, each subchannel mapping time slot 434 may have the timing information for associated narrower-bandwidth subscriber stations.

In some embodiments, standard channel preamble 422 may be transmitted for receipt by the full-bandwidth subscriber stations prior to the transmission of standard channel mapping time slot 424. Standard channel preamble 422 may allow synchronization by a full-bandwidth subscriber station. Subchannel preambles 432 may be transmitted for receipt by the narrower-bandwidth subscriber stations prior to the transmission of subchannel mapping time slot 434. Subchannel preambles 432 may allow synchronization by the narrower-bandwidth subscriber stations. In these embodiments, subchannel preambles 432 may be transmitted on an associated one of a plurality of subchannels (406-412) of standard channel 414. Narrower-bandwidth subscriber stations may listen for preambles associated with their bandwidth profile and according can easily identify the proper subchannel that they will be using.

Downlink data may be transmitted to the full-bandwidth subscriber stations in standard data time slots 426, and downlink data may be transmitted to the narrower-bandwidth subscriber stations in subchannel data time slots 436. Subchannel data time slots 436 may be transmitted on an associated one of the subchannels (i.e., subchannels 406-412) of standard channel 414. In some embodiments, the full-bandwidth subscriber stations and the narrower-bandwidth subscriber stations may know when to receive their downlink data based on the timing information received in mapping time slots 424 and 434.

In some embodiments, uplink data from full-bandwidth subscriber stations may be received at base station 102 (FIG. 1) during standard uplink data time slots 446, and uplink data from narrower-bandwidth subscriber stations may be received at the base station during subchannel uplink data times slots 456. In these embodiments, the narrower-bandwidth subscriber stations may be synchronized to provide their uplink data to the base station substantially simultaneously. In these embodiments, each narrower-band subscriber station may transmit uplink data on its assigned subchannel during times provided during mapping time slot 434.

In some embodiments, mapping time slot 424 includes a list of time slots allocated to the full-bandwidth subscriber stations, and each subchannel of mapping time slot 434 may include a list of time slots allocated to narrower-bandwidth subscriber stations associated with the particular subchannel. From the point of view of a narrower-bandwidth subscriber station, the narrower-bandwidth subscriber stations may not even realize they are communicating with a full bandwidth base station because the base station may use the narrower-bandwidth subscriber station's protocol in the narrower-bandwidth subscriber station's time slots. Narrower-bandwidth subscriber stations may also not realize that other bandwidth profile subscriber stations are communicating with the base station because a narrower-bandwidth subscriber station generally processes only the information received within its allocated subchannel. Accordingly, interoperability between a full bandwidth base station and subscriber stations of various bandwidth profiles, including full bandwidth profiles, is provided. Wireless providers may not need separate base stations for supporting subscriber stations of various bandwidth profiles.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A multicarrier base station for communicating with subscriber stations of a plurality of bandwidth profiles including full-bandwidth subscriber stations and narrower bandwidth subscriber stations, the base station comprising:

physical-layer circuitry comprising separate functional elements for each of the bandwidth profiles configured to generate a decoded bit stream for an associated one of the bandwidth profiles from frequency domain samples, each of the bandwidth profiles being associated with a different fast-Fourier Transform (FFT) size, and a mapper to map frequency-domain samples associated with subcarriers of a multicarrier communication channel to the functional elements for separately processing by one of the functional elements based on subchannel subcarrier allocations associated with a bandwidth profile, wherein sets of subcarriers of a single multicarrier communication channel are allocated for simultaneous communication within a single Orthogonal Frequency Division Multiplexing Access (OFDMA) symbol to the subscriber stations based on the bandwidth profile associated with each of the subscriber stations, wherein the physical layer circuitry is configured to communicate with a full-bandwidth subscriber station using a full set of the subcarriers of the multicarrier communication channel within another OFDMA symbol within a frame, and to simultaneously communicate with two or more narrower-bandwidth subscriber stations using allocated subcarriers within the single OFDMA symbol within the frame, wherein a number of subcarriers within the set that are allocated to each subscriber station depends on the bandwidth profile associated with each subscriber station.

2. The base station of claim 1 wherein the bandwidth profiles include a 20 MHz bandwidth profile associated with an FFT size of 2048, a 10 MHz bandwidth profile associated with an FFT size of 1024, a 5 MHz bandwidth profile associated with an FFT size of 512, a 2.5 MHz bandwidth profile associated with an FFT size of 256, and a 1.25 MHz bandwidth profile associated with an FFT size of 128, and wherein the full bandwidth subscriber station is associated with the 20 MHz bandwidth profile, and the narrower-bandwidth subscriber stations are associated with one of the other bandwidth profiles.

3. The base station of claim 2 further comprising Fourier transform circuitry to perform Fourier transformations on multicarrier signals received within a bandwidth of the multicarrier communication channel to generate the frequency-domain samples associated with each of the subcarriers, wherein the mapper is to separate the frequency-domain samples based an allocated subchannel assignment for the associated subcarrier, wherein the two or more narrower-bandwidth subscriber stations are allocated non-overlapping portions of the subcarriers of the full set for simultaneous communication.

4. The base station of claim 3 wherein the mapper further combines frequency-domain samples associated with subcarriers for each of the bandwidth profiles, and wherein the base station further comprises inverse Fourier transformation circuitry to perform an inverse Fourier transformation on the combined frequency-domain samples to generate a single multicarrier communication signal for subsequent transmission.

5. The base station of claim 2 further comprising a scheduler to divide a single multicarrier communication channel into a plurality of subchannels based on the bandwidth profiles of subscriber stations, wherein each subchannel comprises a predetermined number of orthogonal subcarriers of the multicarrier communication channel, wherein the predetermined number of subcarriers for each subchannel is based on an associated one of the bandwidth profiles.

6. The base station of claim 2 further comprising:

a convergence sublayer to separate data designated for subscriber stations based on their bandwidth profile; and a scheduler to generate frames for each of the bandwidth profiles, wherein the physical-layer circuitry is adapted to generate frequency-domain symbol-modulated subcarriers for each bandwidth profile from the frames generated by the scheduler.

7. The base station of claim 2 further comprising front-end physical-layer circuitry to transmit timing information for full-bandwidth subscriber stations in a standard channel mapping time slot, and to transmit timing information for narrower-bandwidth subscriber stations in a subchannel mapping time slot, wherein the standard channel mapping time slot is transmitted in an initial portion of a downlink subframe, and
    wherein the subchannel mapping time slot is transmitted in a later portion of the downlink subframe.

8. The base station of claim 7 wherein the standard channel mapping time slot is transmitted using subcarriers comprising a standard channel, and wherein the subchannel mapping time slot is divided into one or more subchannels of the standard channel, each subchannel of the subchannel mapping time slot having timing information on different subchannels simultaneously transmitted to the narrower-bandwidth subscriber stations.

9. The base station of claim 8 wherein the front-end physical-layer circuitry is adapted to transmit a standard channel preamble for receipt by the full-bandwidth subscriber stations prior to the transmission of the standard channel mapping time slot, the standard channel preamble to allow synchronization by the full-bandwidth subscriber stations, wherein the front-end physical-layer circuitry is further adapted to transmit subchannel preambles for simultaneous receipt by the narrower-bandwidth subscriber stations prior to the transmission of the subchannel mapping time slot, the subchannel preambles to allow synchronization by the narrower-bandwidth subscriber stations, and wherein the subchannel preambles are each transmitted simultaneously on an associated one of the subchannels of the standard channel.

10. The base station of claim 7 wherein the front-end physical-layer circuitry is adapted to transmit downlink data to the full-bandwidth subscriber stations in standard data time slots and to transmit downlink data to the narrower-bandwidth subscriber stations in subchannel data time slots, and wherein the subchannel data time slots are transmitted simultaneously to two or more narrower bandwidth subscriber station on the subchannels of the standard channel.

11. The base station of claim 7 wherein the front-end physical-layer circuitry is adapted to receive uplink data from the full-bandwidth subscriber stations in standard data time slots and to receive uplink data from the narrower-bandwidth subscriber stations in subchannel data time slots, and wherein the subchannel data time slots are concurrently received on an associated one of the subchannels of the standard channel.

12. The base station of claim 2 further comprising a media-access control (MAC) layer that includes separate functional elements to process bits from each bandwidth profile and to apply one of a plurality of protocols to the separated data based on the associated bandwidth profile for use in generating separate data streams for each bandwidth profile.

\* \* \* \* \*